P. BALL & B. FITTS.
Water-Filters.

No. 138,466.  Patented May 6, 1873.

Witnesses
E. Gibson
S. A. Welch

Inventors
Phinehas Ball
Benaiah Fitts

UNITED STATES PATENT OFFICE.

PHINEHAS BALL AND BENAIAH FITTS, OF WORCESTER, MASSACHUSETTS.

IMPROVEMENT IN WATER-FILTERS.

Specification forming part of Letters Patent No. 138,466, dated May 6, 1873; application filed February 13, 1873.

*To all whom it may concern:*

Be it known that we, PHINEHAS BALL and BENAIAH FITTS, of Worcester, the county of Worcester and State of Massachusetts, have invented certain Improvements in Water-Filters, of which the following is a specification, reference being had to the accompanying drawing, in which—

Figure 1:
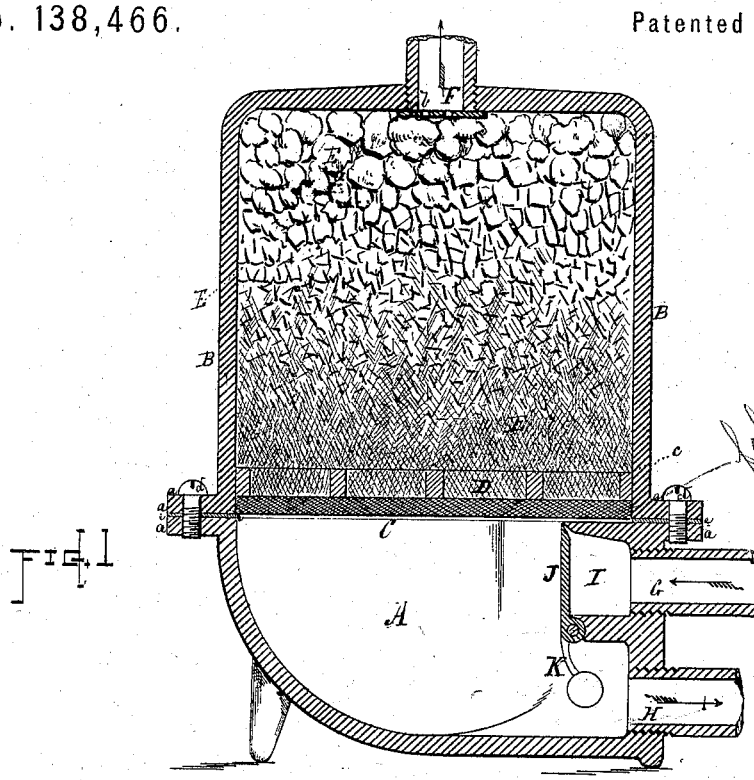
Figure 2:
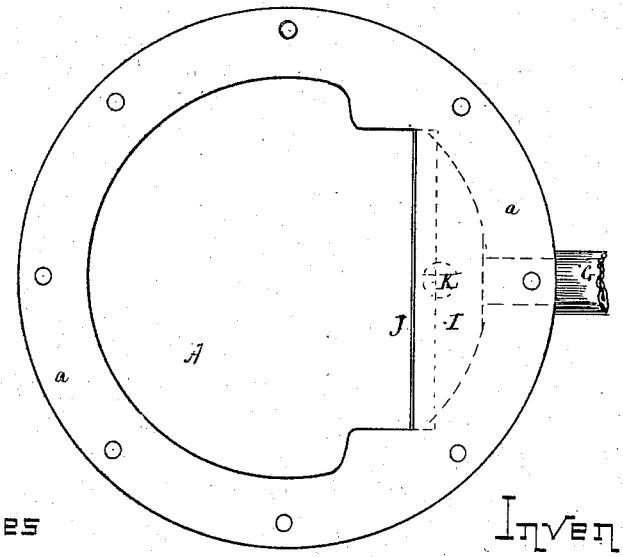

Figure 1 represents a vertical section taken centrally through one of our improved filters, and Fig. 2 a plan of the same.

The object of our invention is to provide a cheap and simple yet effective self-cleaning filter for family and other purposes, and which will be little liable to get out of order.

The filter is to be attached to the main service-pipe, and consists of two principal compartments, A and B, separated by a felt filter or strainer, C, or one made of other analogous or suitable material. This strainer is placed upon and secured to a grate, D, by means of screws or other device, the grate D in turn being fastened, through the instrumentality of lugs cast on or otherwise secured to its sides, to the flange $a$ of the upper compartment by means of screw-bolts, there being depressions formed in the flange for their reception. Immediately over the grate is placed a sheet of fine metallic gauze, $c$, to prevent the passage downward of the filtering material E placed above it, and which is made to fill the remaining portion of the upper chamber A. The eduction-pipe F is arranged at the top of chamber A, and supplies the house or premises with the filtered water. The lower end of this pipe F is provided with a perforated diaphragm, $b$, to prevent the escape of the filtering material E from the filter. The filtering material consists of animal-charcoal, sand, magnetic carbide, silicated carbon, spongy iron, or any suitable combination of these, or other filtering mediums, which will act as a chemical agent for the purification of the water from morbific and decayed animal or vegetable substances held either in solution or suspension in the water. In filling the filter with these substances the coarser particles are placed in the top and the finer next the wire-gauze strainer $c$, which rests on the grate D, so as to prevent the forcing of the fine material through the meshes of the diaphragm $b$ that protects the mouth of the eduction-pipe. The felt or cloth strainer C should be of such close texture and made of such material as to intercept, as far as practicable, on its under surface, all impurities held in suspension in the water; and, as this filter is one which acts by upward filtration, the impurities thus arrested will be removed by the incoming current of water from the service-pipe G and fall to the bottom of the lower compartment A, and from which it is discharged through an eduction-pipe, H, at the bottom of the chamber, and which may be made to communicate with a water-closet, urinal, or sewer, or utilized in any other desirable way—as, for instance, in washing windows, yards, or for stable use; or it may simply be connected with a waste cock and pipe, whereby chamber A may be washed out as occasion requires. To remove the impurities from the under face of the felt strainer C that portion of chamber A to which the induction-pipe G is secured is so constructed as to form a small separate chamber, I, the rear side of which is closed by a mouth-piece or valve, J, hinged at its under side to the lower wall of chamber I, so that the water is discharged from this chamber at the top in a line parallel with the plane of filter C, but in such manner as to impinge upon and pass over its under surface, thereby washing from its face all the impurities which have been intercepted by it. By this arrangement the filter is constantly kept in a condition to properly perform its office. The hinged mouth-piece J is provided with a weighted lever, K, in such manner as to open and close in a ratio corresponding to the pressure of the water passing in at any given time, and this weight and leverage may be so adjusted as to keep the mouth closed up to any given pressure of water required.

Where it is desired continuously to use the wash-out pipe H for any given purpose, or for any considerable length of time at a time, the capacity of the induction-pipe G may be made large enough to supply it, and yet keep up sufficient pressure within chamber A to yield a full supply of filtered water through pipe F for the use of the premises. As a rule a constant discharge of impurities through the wash-out pipe H is deemed the preferable mode of using the filter, as it will prevent the pollution of the water by decomposition of organic matter, which would otherwise take place were it allowed to remain for any length of time in chamber C, and will otherwise facilitate the filtering process.

The filter is intended to be made of cast-iron, coated on the inside with hydraulic cement to prevent rusting; but may be made of any known suitable material.

The grate D and felt-strainer C are firmly attached to the wall of the upper chamber B, so that the filter may be taken apart without emptying it of its contents by simply removing the screw-bolts d, which secure the two halves together, a packing, e, being interposed between them to render the filter perfectly water-tight.

In setting the filter it is made to stand in an upright position, as in Fig. 1, and is set in the line of the service, and connected therewith by means of union couplings, so that it can be removed at any time without cutting the service.

From what has already been said the operation will be easily understood, as proper connections being made with the induction-pipe G, eduction-pipe F, and wash-out pipe H, and the water from the service turned on, the door J will be forced open, thereby delivering the water into chamber A, and so as to pass along and impinge on the face of the felt-strainer C, and thence upward through the latter and chemical materials E, out through the eduction-pipe F for distribution and use in a purified condition throughout the house or premises, while the coarse and impure matter intercepted by filter C will be carried off through wash-out pipe H, and discharged therefrom wherever and in such manner as may be desired.

Having described our invention, we claim—

1. The combination of the induction-pipe G with the self-adjusting mouth J, as arranged with relation to the mechanical or felt strainer C, for the purpose set forth.

2. The combination of the self-adjusting mouth J and strainer C, as arranged in relation to each other, with the wash-out pipe H, for the purpose specified.

3. The combination, substantially as described, of a felt-strainer, C, or its mechanical equivalent, with the filtering and purifying chambers A and B, when so arranged that the process of filtration through it and the process of cleansing its outer or straining surface from the impurities eliminated from the filtered water shall be carried on simultaneously, in the manner described.

PHINEHAS BALL.
BENAIAH FITTS.

Witnesses:
JOHN C. OTIS,
ABIEL E. WILSON.